United States Patent [19]

Fabrikant et al.

[11] Patent Number: 5,740,724
[45] Date of Patent: *Apr. 21, 1998

[54] DEVICE FOR COOKING OR GRILLING SMALL PIECES OF FOOD AND METHOD OF USE

[76] Inventors: Marvin Fabrikant; Patricia Fabrikant, both of 5149 Tilden St., N.W., Washington, D.C. 20016

[21] Appl. No.: 628,253

[22] Filed: Apr. 5, 1996

[*] Notice: The term of this patent shall not extend beyond the expiration date of Pat. No. 5,520,098.

Related U.S. Application Data

[63] Continuation-in-part of Ser. No. 625,255, Apr. 1, 1996, which is a continuation-in-part of Ser. No. 571,772, Dec. 13, 1995, Pat. No. 5,560,286, which is a continuation-in-part of Ser. No. 442,931, May 17, 1995, Pat. No. 5,520,098.

[51] Int. Cl.$^6$ .................................................... A47J 43/18
[52] U.S. Cl. ........................... 99/426; 99/450; 220/486
[58] Field of Search ........................... 99/345, 346, 374, 99/339, 340, 426, 427, 449, 450; 210/308, 650; 126/25 R, 369, 25 A, 9 R; 211/181, 195, 46, 126, 162; 206/512, 423, 427; 220/485, 486, 491, 494

[56] References Cited

U.S. PATENT DOCUMENTS

| | | | |
|---|---|---|---|
| 181,639 | 8/1876 | Carver | 211/181 |
| 596,189 | 12/1897 | Gerbereux | 211/181 |
| 813,499 | 2/1906 | Johnson | 220/492 |
| 1,257,902 | 2/1918 | McCullough | 220/572 |
| 1,265,627 | 5/1918 | Dickey | 99/426 |
| 1,906,603 | 5/1933 | Hungerford | 99/450 |
| 2,397,410 | 3/1946 | Deacon | 99/410 |
| 2,467,411 | 4/1949 | Tingdale | 40/308 |
| 2,563,691 | 8/1951 | O'Reilly | 99/410 |
| 2,664,876 | 1/1954 | Barker | 126/25 |
| 2,825,481 | 3/1958 | Glenny | 220/492 |
| 2,846,941 | 8/1958 | Goodwin | 99/340 |
| 3,188,939 | 6/1965 | Smith | 220/491 |
| 3,282,460 | 11/1966 | Boznango | 99/416 |
| 3,784,044 | 1/1974 | Bruggeman et al. | 206/512 |
| 3,848,748 | 11/1974 | Ceccarelli | 211/195 |
| 3,866,788 | 2/1975 | Smit | 220/486 |
| 3,946,651 | 3/1976 | Garcia | 99/444 |
| 4,329,977 | 5/1982 | Orter | 126/369 |
| 4,510,855 | 4/1985 | Avner | 99/450 |
| 4,621,739 | 11/1986 | Heymann et al. | 211/181 |
| 5,065,734 | 11/1991 | Elliott | 126/9 R |
| 5,069,196 | 12/1991 | Schlosser et al. | 126/25 R |
| 5,092,311 | 3/1992 | Ririe | 126/25 R |
| 5,146,843 | 9/1992 | Fuller et al. | 99/483 |
| 5,205,208 | 4/1993 | Gongwer | 99/345 |
| 5,305,686 | 4/1994 | Svensson | 99/450 |
| 5,520,098 | 5/1996 | Fabrikant et al. | 99/426 X |

FOREIGN PATENT DOCUMENTS 0645639   3/1964   Belgium .

*Primary Examiner*—Reginald L. Alexander
*Attorney, Agent, or Firm*—Foley & Lardner

[57] ABSTRACT

A device for grilling small pieces of food is described which is a basket made of a perforated metal. The device fits inside of conventional grills even when the lid of the grill is closed and can be easily removed for shaking and turning over of the small pieces of food without their falling out. The basket optionally has a removable lid that can be used independently of the device as a cooking surface. When the lid is in place, the entire device may be turned over. When the lid is either off or in the up position, the food inside the basket may be stirred or moved.

27 Claims, 6 Drawing Sheets

DEVICE FOR COOKING OR GRILLING SMALL PIECES OF FOOD AND METHOD OF USE

This application is a continuation-in-part of U.S. Ser. No. 08/625,255, filed on Apr. 1, 1996, which is a continuation-in-part of U.S. application Ser. No. 08/571,772, filed on Dec. 13, 1995, now U.S. Pat. No. 5,560,286, which is a continuation-in-part of U.S. application Ser. No. 08/442,931, filed on May 17, 1995 now U.S. Pat. No. 5,520,098.

BACKGROUND OF THE INVENTION

Various attempts have been made to develop devices for cooking or grilling specialty food items, particularly for use with outdoor barbecue grills. For example, U.S. Pat. No. 4,510,855 to Avner describes a secondary grilling apparatus which comprises a flat sheet of metal with rectangular openings which clips onto the bars of conventional barbecue grills. The sheet provides a secondary surface for grilling with smaller openings. However, the device cannot be easily taken out of the barbecue grill when hot and does not permit easy turning over of food items.

U.S. Pat. No. 5,069,196 to Schlosser et al. describes a pivoting auxiliary rack which attaches to the perimeter of a barbecue grill and can be pivoted from the side attachment over the surface of the grill or off to the side for easy retrieval of cooked food items. The pivoting rack comprises a circular flat grill with a rail around the edge to prevent food from falling off. The circular flat grill is similar to the main grill of the barbecue, but is held above the main grill by means of a pivot. The device suffers the same problems that a regular grill with longitudinal bars in that small food items easily slip through. Also, the device cannot be easily lifted out of the grill and shaken to turn over food items.

U.S. Pat. No. 2,846,941 to Goodwin discloses a barbecue basket which fully encases food items and is mounted on a spit, permitting one to easily turn cooking food items over for cooking on both sides. The device cannot be easily removed from the grill because it is mounted on a spit. Also, the device would not be suitable for small food items because the longitudinal bars create lengthwise openings through which small food items would fall out.

Other devices include the PLATINUM GRILLING WOK™ (sold by Charcoal Champion) which comprises a square bottom with trapezoidal sides that flare outward from their attachment to the square bottom. The wok contains some small circular openings to allow circulation of heated air and smoke. However, the wok contains no lid that permits shaking of food items to easily turn them over. In addition, the limited number of openings does not allow full circulation of heated air and smoke which are important for achieving optimum grilling flavor.

Still another device is the BARBECUE GRILLING GRID™ (sold by Charcoal Champion) which comprises a flat sheet with diamond-shaped openings and an upturned edge on one side. The grid cannot be easily lifted off of the grill, nor can it permit shaking of food items to turn them over without their falling out. It is essentially one-sided.

SUMMARY OF THE INVENTION

It is an object of the present invention to provide a device for cooking or grilling small food items which permits optimum circulation of heated air and smoke to achieve full grilling/cooking flavor. The device is entirely independent from the grill requiring no attachment whatsoever. It is an object of the present invention to provide a device that can be easily removed from the barbecue grill, lifted out, and shaken to turn food items over without their falling out. These same functions may be achieved while cooking with the device on the grill grate by either removing the lid or lifting the lid and stirring, shifting or moving the food items inside the device with a cooking implement (such as tongs, spatula, fork, etc.).

The use of a lid with the device is optional. With the lid on or off, spices, sauces, and flavorings may be added while cooking. Also, the grilling device of the present invention is designed to fit completely within standard barbecue grills so that the top of the grill can be closed while offering the maximum amount of cooking surface area. Still another object of the present invention is to provide a light-weight grilling device that can be easily and cheaply manufactured from a single piece of starting material.

With these objects in mind, the present inventors discovered that a grilling device could be fashioned out of light-weight stainless steel mesh having square openings or perforated metal, which could easily be fabricated from a single flat piece of mesh or metal by folding and which would satisfy the above objects. Due to the flexibility of the stainless steel mesh or perforated metal, the device can be shaped to fit the interiors of standard barbecue grills, permitting the lid of the grill to be completely shut while providing the maximum surface area for cooking small pieces of food and maximizing the aromatic effect of barbecue cooking or grilling. Since the device is independent from the grill on which it is used, food items may be prepared and placed inside the device at one location, carried and then cooked at the grill. Once cooking is completed, the food items may be carried from the grill inside the device to another desired location.

DETAILED DESCRIPTION OF THE PREFERRED EMBODIMENTS

Figure 1:
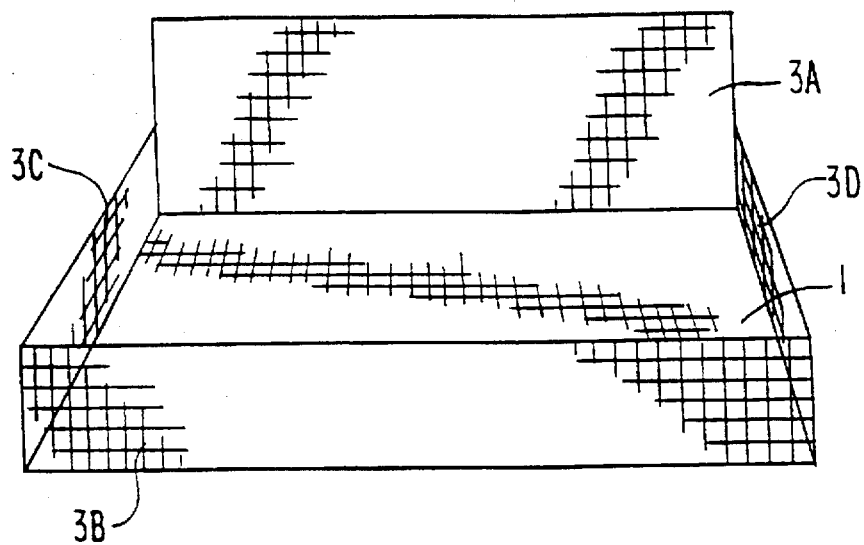
FIG. 1 shows one embodiment of the present invention without a top.

In one embodiment, the present invention is directed to a device for grilling small pieces of food, wherein the device comprises a basket composed of mesh having square openings throughout the mesh or perforated metal and the basket has a base that matches the shape of the grill and four side walls which are high enough to retain small pieces of food when the device is shaken to turn the small pieces of food over, wherein the mesh is made of a material suitable for cooking or grilling food that is welded, soldered, or woven. Preferably, the basket is shaped to fit within the interior of a grill when the lid of the grill is closed. Optionally, the basket of the device is covered with a lid that may be fastened to the device or placed on top of the device.

As used herein, the term "perforated metal" refers to metal into which holes or openings have been punched at regular intervals. The spacing between openings is not critical, and a greater or less number of openings may be selected according to the amount of air circulation desired through the basket. Also, the shape and size of the openings is not critical and again, can be adjusted depending on the desired amount of air circulation. Preferably, circular or diamond-shaped holes are punched into the metal to form a perforated metal similar to that used in the products mentioned above made by Charcoal Champion.

Another embodiment of the present invention is a method of using the device to grill small pieces of food on a grill comprising placing the pieces of food in the basket, placing the basket on the grill, closing the lid of the grill, removing the basket after the small pieces of food are cooked on one side, shaking the basket to turn the pieces of food over onto their uncooked sides, and placing the basket onto the grill until the small pieces of food are cooked. Optionally, the entire device may be turned upside down with the food remaining in the basket to turn the food over when a lid is in place.

Preferably, the device is used on a covered grill having a lid and the base of the device has a rectangular or circular shape which matches the dimensions of the most commonly sold outdoor barbecue grills. More preferred is a rectangular base measuring about 11 inches by about 16 inches.

The mesh or perforated metal can be made of any material suitable for cooking or grilling pieces of food that is welded, soldered or bent into a desired shape. Preferably, the mesh or perforated metal is stainless steel or mild steel covered with a non-stick coating such as XYLON™ (manufactured by Whitford Manufacturing). The preferred size of the openings throughout the mesh or perforated metal is between 14 gauge and 19 gauge, or which measure between about 0.2 inches across to about 0.8 inches across. The most preferred size of the openings is about 0.5 inches across.

The mesh or perforated metal can optionally be nickel-plated, porcelain-coated, or coated with a non-stick coating suitable for grilling or cooking.

As used herein, "small pieces of food" refers to those small pieces of food cooked on grills which normally fall through the longitudinal bars of a conventional grill grate. In particular, these small pieces of food include sliced, chopped, unchopped, chunked, and whole vegetables, fruits, scallops, shrimp, and pieces of meat or fish.

Preferably, one or more divider walls can be placed inside the basket and attached to the base to create separate areas for placing different types of small food pieces. For example, all the vegetables can be placed on one side of a divider wall and all the chopped meat pieces can be placed on the other side of the divider wall.

For convenience, only FIG. 1 shows a partial representation of the perforated metal pattern. FIGS. 2–11 are in block style, with a partial representation of a mesh pattern. However, it should be understood that the perforated metal and mesh can be used interchangeably in any of the devices shown in FIGS. 1–11 and, in all cases, the partial pattern shown in the figures represent the patterns over the entire device in practice.

FIG. 1 shows a preferred embodiment of the present invention wherein one of the four side walls 3A adjoining the cooking base 1 is raised higher than the other three side walls 3B, 3C and 3D.

Figure 2:
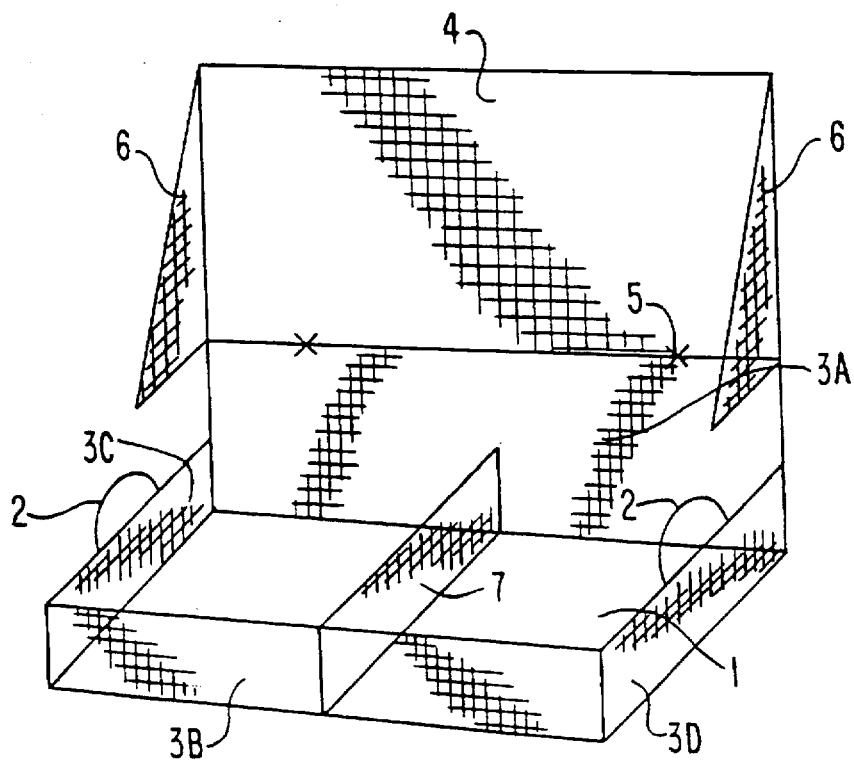
FIG. 2 shows another embodiment similar to that of FIG. 1 with a top in the open position and side handles.

As shown in FIG. 2, it is preferred to attach a lid 4 having two triangular overhang portions 6 by means of fasteners 5 to the raised side 3A. The fasteners may be any suitable fasteners that withstand the heat of cooking or grilling including alligator clips or metal rings. Also, FIG. 2 shows wire semi-circular handles 2 attached to two of the sides 3C and 3D that adjoin the raised side 3A. FIG. 2 also shows a divider wall 7 placed inside the basket for separating different kinds of small food pieces.

Figure 3:
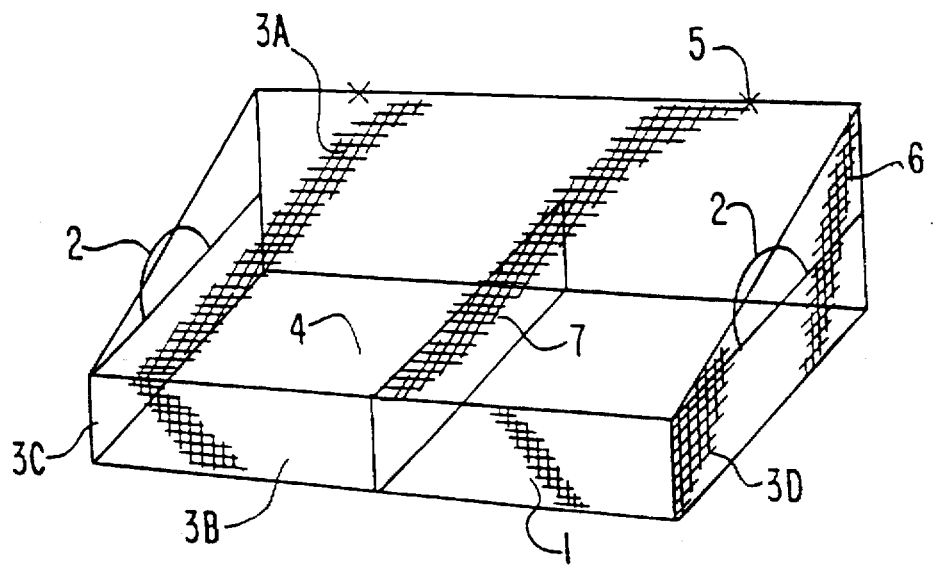
FIG. 3 shows the embodiment of FIG. 2 with the top in the closed position.
Figure 4:
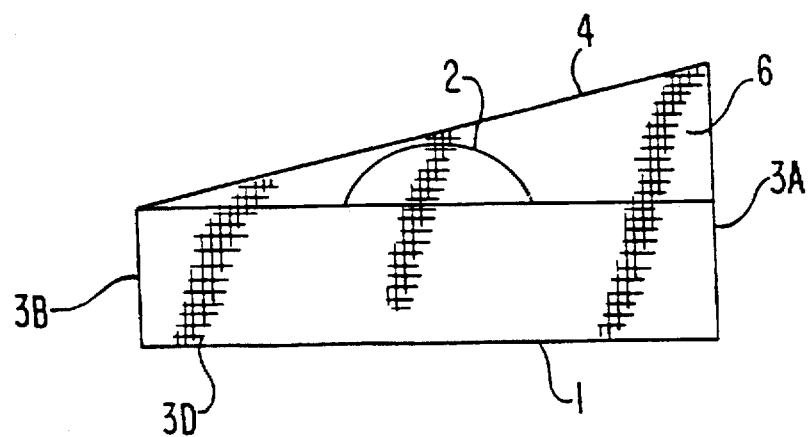
FIG. 4 shows a side view of the embodiment of FIG. 3.

FIG. 3 illustrates the embodiment of FIG. 2 wherein the lid 4 is in the closed position. Due to the raised edge 3A, the lid slopes downward when closed to meet the top edge of the lower front side 3B. This embodiment is advantageous because it fits inside most rectangular-shaped outdoor grills wherein the lid of the grill slopes downward toward the front of the grill.

The embodiments shown in FIGS. 1–4 can be manufactured from a single flat piece of perforated metal by making cuts in the piece of perforated metal according to desired dimensions and folding the sides of the cut pieces upward and joining the corners with fasteners or by welding or other suitable means for joining pieces of perforated metal together. For example, starting from a single piece of perforated metal, the lid 4 can be cut out and the overhang portions 6 can be folded downward. One or more divider walls 7 can be cut from the single starting piece of perforated metal and later attached into the interior of the basket. The basket is formed from the single piece of perforated metal by folding the pre-cut sides 3A, 3B, 3C, and 3D upward so that the edges of the sides meet each other. Thereafter, the adjoining edges may be fastened by suitable means for fastening pieces of perforated metal together such as closing rings, clips, solder or welding.

FIGS. 5–8 relate to another preferred embodiment of the present invention, which also can be manufactured from a single flat piece of perforated metal by making cuts in the piece of perforated metal according to desired dimensions and folding the sides of the cut piece upward and joining the corners with fasteners or by welding or other suitable means for joining pieces of perforated metal together as discussed more fully below.

Figure 5:
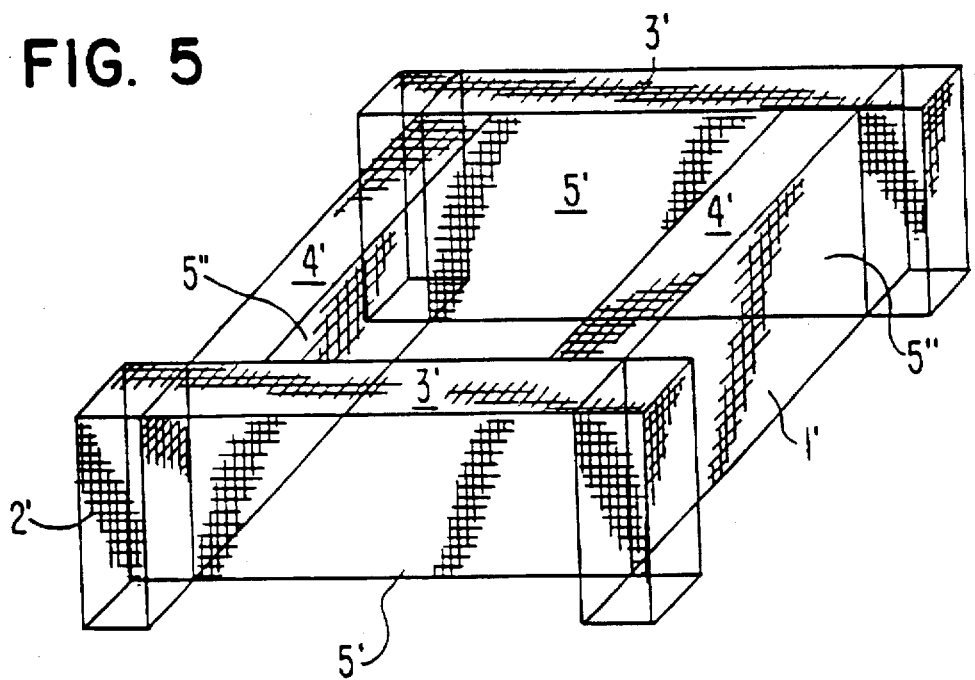
FIG. 5 is a top view of another embodiment with two inwardly facing top edges and two outwardly facing top edges and square grasping handles at each corner and hand spaces between the two corner handles.

In the preferred embodiment of FIG. 5, there is an interior rectangular cooking base 1', two outwardly facing top edges 3' adjoining two side walls 5', two inwardly facing top edges 4' adjoining the other two side walls 5", and four square grasping handles 2' at each corner of the base 1'. This embodiment is advantageous because the inwardly facing edges 4' help to retain the small pieces of food when the basket is moved while on the grill and or turned over onto its side, or removed from the cooking surface and shaken to the turn the food pieces over. The outwardly facing edges 3' provide handles for easy grasping of the basket during shaking, turning the device upside down with the lid on, and in removing the device from the grill.

Figure 6:
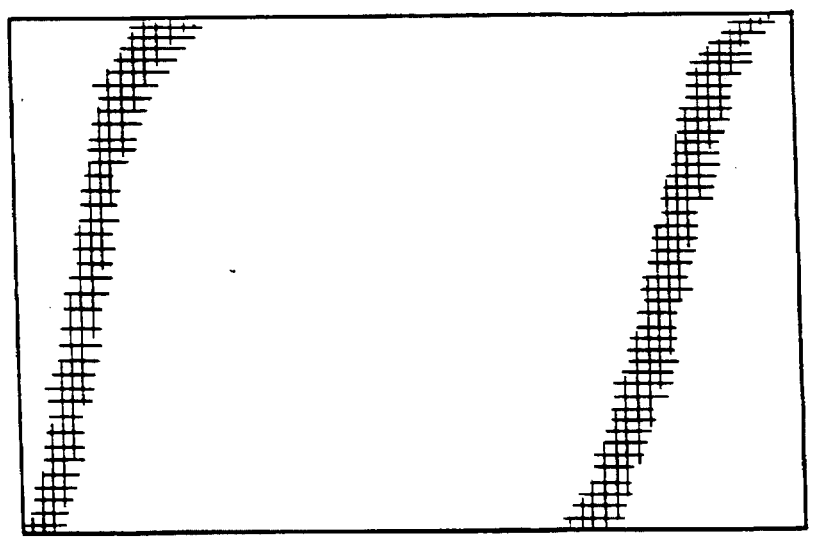
FIG. 6 is a top view of the lid for the embodiment of FIG. 5.

FIG. 6 shows the lid for the device of FIG. 5. The lid is a flat rectangular piece of perforated metal adapted to be placed on top of the opening in the device of FIG. 5. The lid can optionally be placed on top of the device and removed to permit stirring or moving of the contents within the basket. Also, the lid can be used for gathering contents in the basket by turning the device upside down while the lid is on or used for cooking by turning the device upside down so that the lid becomes the cooking base or independently removing the lid and using it as a second cooking base. The lid may be fastened at the top edge at one or more of the sides 5' so that it can be opened and closed.

Figure 7:
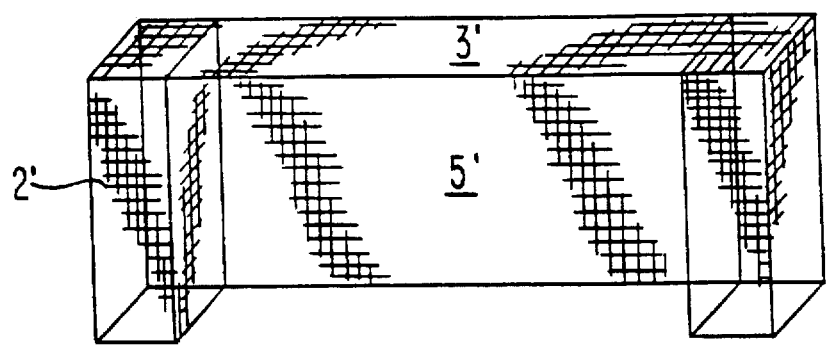
FIG. 7 is a frontal cut-away view of the embodiment of FIG. 5.

FIG. 7 shows the 5' side wall and corner handles 2' cut away from the rest of the device of FIG. 5. FIG. 7 illustrates how the outwardly facing edge 3' meets the two corner handles 2'

Figure 8:
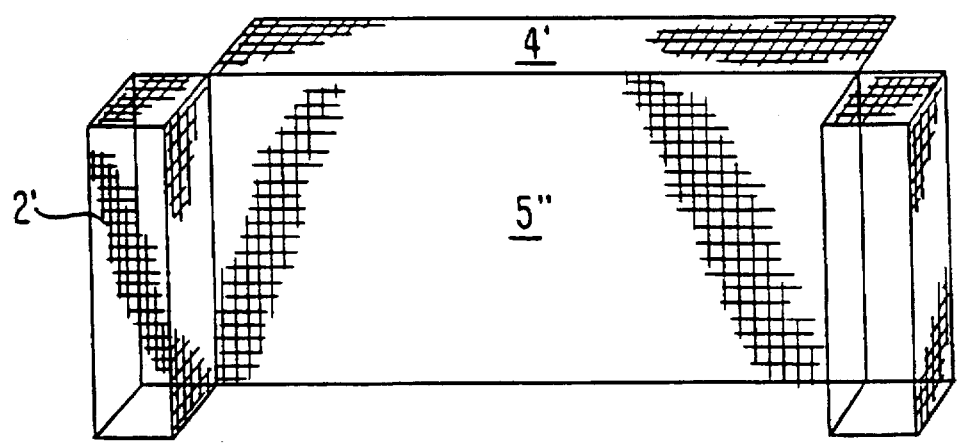
FIG. 8 is a side cut-away view of the embodiment of FIG. 5.

FIG. 8 shows the 5" side wall and corner handles cut away from the rest of the device of FIG. 5. FIG. 8 illustrates how the inwardly facing edge 4' faces away from the corner handles 2' toward the inside of the basket.

Figure 9:
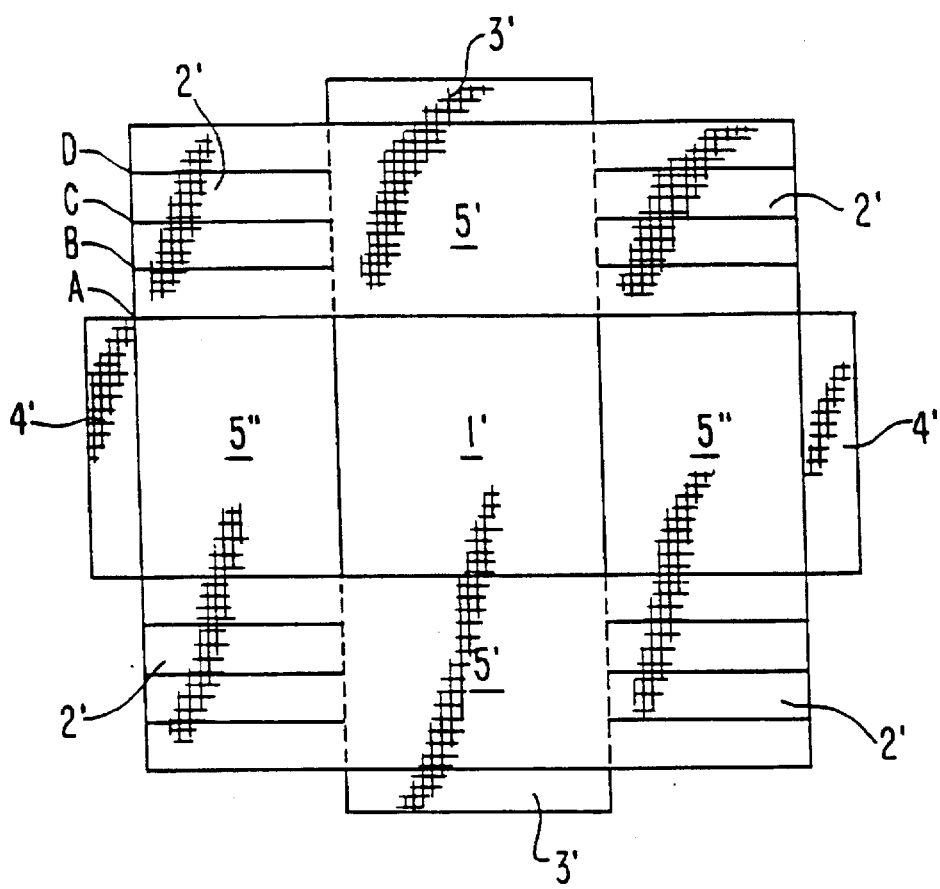
FIG. 9 shows the device of FIGS. 5–8 prior to folding.

FIG. 9 shows the device of FIG. 5 prior to folding of a piece of the perforated metal. The four dashed lines indicate the four places where the flat piece of perforated metal is internally pre-cut. All internal solid lines indicate the lines along which a fold must be made. First, the two 5' side walls which include the two outwardly facing 3' edges are folded up. Second, the other two 5" side walls which include the two inwardly facing 4' edges and the corner post portions 2' are folded up forming a basket. The inwardly facing 4' edges are folded to the inside of the basket. The outwardly facing 3' edges are folded to the outside of the basket. Lastly, the corner posts are formed by folding first at line A away from the basket, then at line B in a direction parallel to the adjoining side wall 5", then at line C and finally at line D. In this way, the four corners of the corner post 2' are made.

Figure 10:
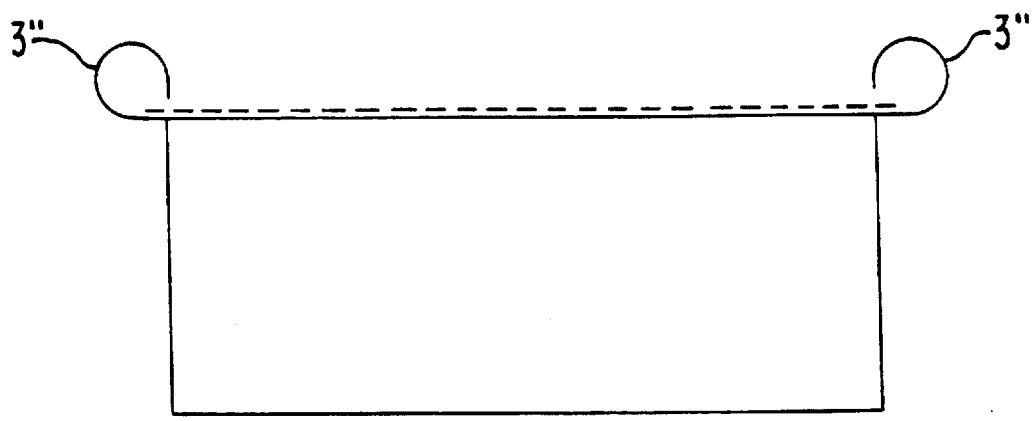
FIG. 10 shows a preferred embodiment of the device with slots formed by curled edges that lock in the lid.

FIG. 10 shows a preferred embodiment of the device of FIG. 5, wherein of the two 3" top edges have been curled over towards the inside of the basket to simultaneously create a roll-shaped gripping handle and locking grooves which accept the edges of the lid of FIG. 6, which is shown as a dashed line in FIG. 10, and hold it in place on top of the basket. The lid of FIG. 6 can be removed by sliding it laterally out of the locking grooves. Since a roll-shaped gripping handle is formed by the curled top edges 3" having a C-shaped cross section, there is no need for the square grasping handles 2' of the embodiment of FIG. 5.

Figure 11:
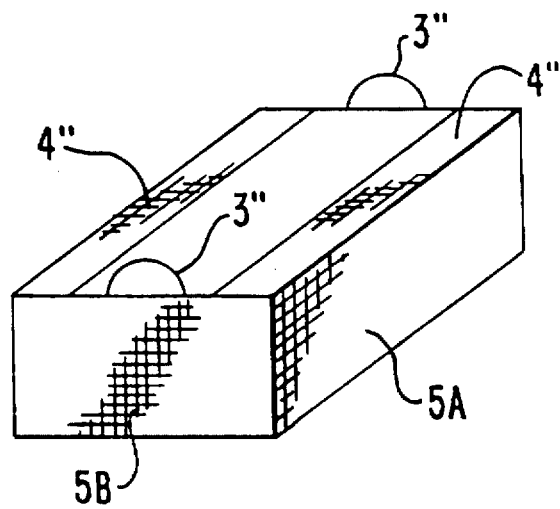
FIG. 11 shows a preferred embodiment of the device of FIG. 5 without corner posts and without the outwardly facing top edges, which instead has optional semicircular wire handles for picking up the device.

FIG. 11 shows a preferred embodiment of the device of FIG. 5, wherein no outwardly facing top edges are present on side walls 5B, but the two inwardly facing top edges 4" are present on sidewalls 5A. Optionally, handles 3" or other conventional handles can be included on side walls 5B for easy handling of the device. The inwardly facing top edges 4" help to retain small pieces of food in the basket when the device is shaken or turned onto its side to turn the small pieces of food over onto their uncooked sides. Of course, the device may be used without any handles 3" at all.

It will be understood that various modifications in the invention as described herein may be made without departing from the spirit of the invention and from the scope of the claims which follow.

What is claimed is:

1. A device for cooking or grilling small pieces of food comprising a basket including a perforated metal made of a material suitable for cooking or grilling small pieces of food having openings throughout the perforated metal, said basket having a base and four adjoining side walls, wherein two opposite side walls each have an inwardly facing top edge to retain small pieces of food when the device is shaken or moved to turn the small pieces of food over.

2. The device as claimed in claim 1 wherein the base is rectangular thereby forming a cube-shaped basket with an opening on one side.

3. The device as claimed in claim 2 wherein the perforated metal is perforated stainless steel having circular or square openings that measure between about 0.2 and about 0.8 inches across.

4. The device as claimed in claim 3 wherein the perforated metal is covered with a non-stick coating suitable for cooking or grilling small pieces of food.

5. The device as claimed in claim 4 wherein the perforated metal is nickel-plated or porcelain-coated.

6. The device as claimed in claim 2 further comprising a lid that may be placed on top of the device, said lid consisting essentially of a flat rectangular piece of said perforated metal.

7. The device as claimed in claim 2 further comprising two handles attached to opposite side walls on the two side walls which do not have the inwardly facing top edges.

8. The device as claimed in claim 7 wherein the handles are semicircular wire handles.

9. The device as claimed in claim 2 further comprising two outwardly facing top edges which serve as handles and are attached to the two opposite side walls which do not have the inwardly facing top edges.

10. A method of grilling small pieces of food on a grill having a top with the device as claimed in claim 1 comprising placing the pieces of food in the basket, placing the basket on a grill with a top, closing the top of the grill to completely enclose the device within, opening the top after a first cooking period during which one side of the pieces of food has been cooked, shaking the basket of the device to turn the pieces of food over after one side of the pieces of food has been cooked, closing the top for a time sufficient to finish cooking the pieces of food, opening the top, and removing the device from the grill when the small pieces of food are cooked.

11. The method as claimed in claim 10 wherein the base of the basket of the device is rectangular thereby forming a cube-shaped basket with an opening on one side.

12. The method as claimed in claim 11 wherein the perforated metal of the device is stainless steel perforated metal having square openings that measure between about 0.2 and about 0.8 inches across.

13. The method as claimed in claim 12 wherein the perforated metal is covered with a non-stick coating suitable for cooking or grilling small pieces of food.

14. The method as claimed in claim 13 wherein the perforated metal is nickel-plated or porcelain-coated.

15. The method as claimed in claim 12 wherein the device further comprises a lid that may be placed on top of the device, said lid consisting essentially of a flat rectangular piece of said perforated metal.

16. The method as claimed in claim 10 wherein the device further comprises two handles attached to opposite side walls on the two side walls which do not have the inwardly facing top edges.

17. The method as claimed in claim 16 wherein the handles are semicircular wire handles.

18. The method as claimed in claim 10 wherein the device further comprises two outwardly facing top edges which serve as handles and are attached to the two opposite side walls which do not have the inwardly facing top edges.

19. The method as claimed in claim 15 wherein the lid is used independently as a second grilling or cooking surface.

20. A device for cooking or grilling small pieces of food comprising a basket of (i) a mesh made of a material suitable for cooking or grilling small pieces of food or (ii) a perforated metal, said basket having a base and four adjoining side walls, wherein two opposite side walls each have an outwardly facing top edge large enough to permit grasping of the device.

21. The device as claimed in claim 20 wherein the base is rectangular thereby forming a cube-shaped basket with an opening on one side.

22. The device as claimed in claim 21 wherein the perforated metal is perforated stainless steel having circular or square openings that measure between about 0.2 and about 0.8 inches across.

23. The device as claimed in claim 22 wherein the perforated metal is covered with a non-stick coating suitable for cooking or grilling small pieces of food.

24. The device as claimed in claim 22 wherein the perforated metal is nickel-plated or porcelain-coated.

25. The device as claimed in claim 21 further comprising a lid that may be placed on top of the device, said lid consisting essentially of a flat rectangular piece of said perforated metal.

26. A method of grilling small pieces of food on a grill with the device as claimed in claim 20 comprising placing the small pieces of food in the basket, placing the basket on top of a grill, shaking the basket of the device by grasping the outwardly facing top edges to turn the pieces of food over, and removing the device from the grill when the small pieces of food are cooked.

27. A method of grilling small pieces of food on a grill comprising placing the small pieces of food in a basket of (i) a mesh made of a material suitable for cooking or grilling small pieces of food or (ii) a perforated metal, said basket having a base and four adjoining side walls, placing the basket on top of a grill, shaking the basket to turn the pieces of food over, and removing the basket from the grill when the small pieces of food are cooked.

* * * * *

REEXAMINATION CERTIFICATE (4304th)

United States Patent
Fabrikant et al.

(10) Number: US 5,740,724 C1
(45) Certificate Issued: *Apr. 3, 2001

(54) DEVICE FOR COOKING OR GRILLING SMALL PIECES OF FOOD AND METHOD OF USE

(75) Inventors: Marvin Fabrikant; Patricia Fabrikant, both of 5149 Tilden St., NW., Washington, DC (US) 20016

(73) Assignees: Marvin Fabrikant; Patricia Fabrikant, both of Washington, DC (US)

Reexamination Request:
No. 90/005,661, Mar. 1, 2000

Reexamination Certificate for:
Patent No.: 5,740,724
Issued: Apr. 21, 1998
Appl. No.: 08/628,253
Filed: Apr. 5, 1996

(*) Notice: This patent is subject to a terminal disclaimer.

Related U.S. Application Data

(63) Continuation-in-part of application No. 08/625,255, filed on Apr. 1, 1996, which is a continuation-in-part of application No. 08/571,772, filed on Dec. 13, 1995, now Pat. No. 5,560,286, which is a continuation-in-part of application No. 08/442,931, filed on May 17, 1995, now Pat. No. 5,520,098.

(51) Int. Cl.[7] .................................. A47J 43/18
(52) U.S. Cl. ..................... 99/426; 99/450; 220/486; 426/523
(58) Field of Search ................ 99/345, 346, 374, 99/339, 340, 426, 427, 449, 450; 210/308, 650; 126/25 R, 369, 25 A, 9 R; 211/181, 195, 46, 126, 162; 206/516, 423, 427; 220/485, 486, 491, 494

(56) References Cited

U.S. PATENT DOCUMENTS

| | | |
|---|---|---|
| 181,639 | 8/1876 | Carver .................................. 211/181 |
| D. 201,937 | 8/1965 | Johnson . |
| D. 341,292 | 11/1993 | Johnston .............................. D7/409 |
| 596,189 | 12/1897 | Gerbereux ............................ 211/181 |
| 813,499 | 2/1906 | Johnson ................................ 220/492 |
| 1,257,902 | 2/1918 | McCullough ........................ 220/572 |
| 1,265,627 | 5/1918 | Dickey .................................... 99/426 |
| 1,906,603 | 5/1933 | Hungerford ............................ 99/450 |
| 2,397,410 | 3/1946 | Deacon .................................. 99/410 |
| 2,467,411 | 4/1949 | Tingdale ................................ 40/308 |
| 2,563,691 | 8/1951 | O'Reilly ................................. 99/410 |
| 2,664,876 | 1/1954 | Barker ................................... 126/25 |
| 2,825,481 | 3/1958 | Glenny .................................. 220/492 |
| 2,846,941 | 8/1958 | Goodwin ................................ 99/340 |
| 3,188,939 | 6/1965 | Smith .................................... 220/491 |

(List continued on next page.)

FOREIGN PATENT DOCUMENTS 0645639  3/1964  (BE).

OTHER PUBLICATIONS

Brinkmann Preferred Customer Club; Mail Order Catalog; 1997; Brook 0001–0003.

Brinkmann Smokeshop; No Date; Smoker Basket; Brook 0004–0005.

The Brinkmann Corporation; Imports Transaction History; Jun. 25, 1993–Jun. 8, 1998; Brook 0009.

The Brinkmann Corporation 1993 Product Catalog; No Date; Brook 0010–0012.

The Brinkmann Corporation 1994 Product Catalog; No Date; Brook 0013–0016.

(List continued on next page.)

*Primary Examiner*—Reginald Alexander

(57) ABSTRACT

A device for grilling small pieces of food is described which is a basket made of a perforated metal. The device fits inside of conventional grills even when the lid of the grill is closed and can be easily removed for shaking and turning over of the small pieces of food without their falling out. The basket optionally has a removable lid that can be used independently of the device as a cooking surface. When the lid is in place, the entire device may be turned over. When the lid is either off or in the up position, the food inside the basket may be stirred or moved.

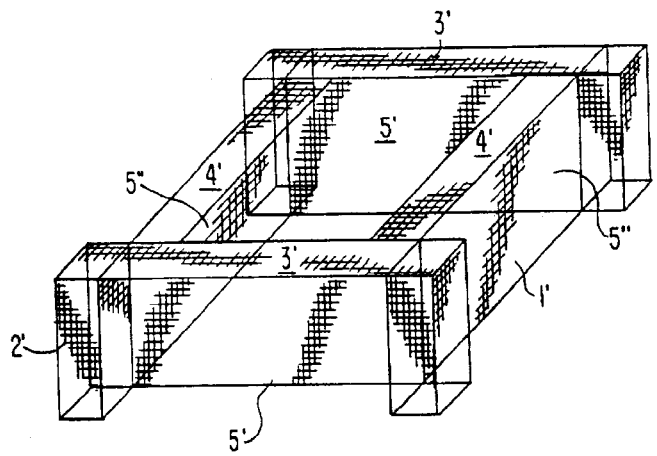

U.S. PATENT DOCUMENTS

| | | | |
|---|---|---|---|
| 3,282,460 | 11/1966 | Boznango | 99/416 |
| 3,784,044 | 1/1974 | Bruggeman et al. | 206/512 |
| 3,848,748 | 11/1974 | Ceccarelli | 211/195 |
| 3,851,639 | 12/1974 | Beddoe | 126/25 |
| 3,866,788 | 2/1975 | Smit | 220/486 |
| 3,946,651 | 3/1976 | Garcia | 99/444 |
| 4,005,646 | 2/1977 | Krüper | 99/427 |
| 4,329,977 | 5/1982 | Orter | 126/369 |
| 4,442,762 | 4/1984 | Beller | 99/427 |
| 4,482,181 | 11/1984 | Shepherd | 294/12 |
| 4,510,855 | 4/1985 | Avner | 99/450 |
| 4,621,739 | 11/1986 | Heymann et al. | 211/181 |
| 4,625,634 | 12/1986 | Krüper | 99/427 |
| 4,826,032 | 5/1989 | Huyghe | 220/19 |
| 4,930,491 | 6/1990 | Purello | 126/332 |
| 4,979,440 | 12/1990 | Latour et al. | 99/445 |
| 5,065,734 | 11/1991 | Elliott | 126/9 R |
| 5,069,196 | 12/1991 | Schlosser et al. | 126/25 R |
| 5,086,694 | 2/1992 | Stuck et al. | 99/443 |
| 5,092,311 | 3/1992 | Ririe | 126/25 R |
| 5,105,725 | 4/1992 | Haglund | 99/446 |
| 5,105,726 | 4/1992 | Lisker | 99/340 |
| 5,146,843 | 9/1992 | Fuller et al. | 99/483 |
| 5,205,208 | 4/1993 | Gongwer | 99/345 |
| 5,206,045 | 4/1993 | Stuck | 426/243 |
| 5,299,553 | 4/1994 | Giebel et al. | 126/25 R |
| 5,305,686 | 4/1994 | Svensson | 99/450 |
| 5,307,797 | 5/1994 | Kleefeld | 126/30 |
| 5,421,318 | 6/1995 | Unruh et al. | 126/25 A |
| 5,906,152 | 5/1999 | Alcorn | 99/399 |

OTHER PUBLICATIONS

The Brinkmann Corporation 1995 Confidential Price List; No Date; Brook 0017–0019.
U.S. TM Reg. No. 1,572,163; Brook 0020.
File History of Reg # 1573165, 1989; Brook 0021–0060.
Big Green Egg; No Date; Brook 0061–0064.
The Big Green Egg; 'EGG'–cessories; No Date; Brook 0065–0066.
The Big Green Egg; Feature List; No Date; Brook 0067–0068.
Media Excerpt; Print and Television; No Date; Brook 0069–0070.
The Big Green Egg; Feature List; No Date; Brook 0071–0073.
The Big Green Egg; Price List; No Date; Brook 0074–0078.
Kamado.com Company; The Original Ceramic Barbecue Grill; No Date; Brook 0079–0082.
U.S. TM Electronic Search System (TESS) Mar. 8, 2000, Brook 0084–0087.
Chef's Catalog; Professional Restaurant Equipment for the Home Chef; Chef's Favorite 1994; Brook 0088–0090.
Grill Lover's Catalog; Char–Broil; No Date; Brook 0091–0095.
The Platinum Collection; Stainless Steel Chimney Starter; No Date; Brook 0096.
Chief's Catalog; Professional Restaurant Equipment of the Home Chef; 1993; Brook 0097–0098.
The Chief's Catalog; Professional Restaurant Equipment for the Home Chef Since 1979; Brook 0099–0100.
Chicago Cutlery; Our Edge is Our Edge; Jan. 20, 2000; Brook 0101–0103.
Happycookers.com; No Date; Brook 0104–0106.
Fine Cooking; The Right Grilling Tools for Great Summer Meals; No Date; Brook 0107–0109.
Fine Cooking; The Right Grilling Tools for Great Summer Meals; No Date; Brook 0110–0112.
Midwest Wire Products LLC; Wire Grill and Basket Specialists; No Date; Brook 0113–0114.
Beacon Inc., No Date; Stainless Steel Wire Molds; Brook 0115–0116.
Beacon Inc., No Date; Wire Processing Screens; Brook 0117–0118.
Grill Toppers; No Date; Brook 0119.
Keating Instant Recovery Fryers; No Date; Brook 0120.
Inferno; No Date; Brook 0121.
United Restaurant Equipment Co. Inc.; Jan. 21, 2000; Brook 0122.
Service Merchandise; No Date; Oscarware Wok Grill Topper; Brook 0123–0126.
Global Mart; No Date; Masterbuilt Restaurant Quality Aluminum Fry Pan, and Basket; Brook 0127.
Almeidas Wire Inc.; No Date; Brook 0128.
The Cajun Shoppe; Non–Stick BBQ Basket; No Date; Brook 0129.
Netmarket.com; No Date; Brinkmann 812–333–0 Smoker Basket; Brook 0130–0131.
Cooling.com; Outdoor Entertaining; No Date; Brook 0132–0133.
A–Best Fixture Co.; Grilling Accessories; No Date; Brook 0134–0136.
Hardware.com; Wok Grill Topper; No Date; Brook 0137.
Grill Lovers Catalogue; Lodge Cast Iron BBQ Grill Grate; No Date; Brook 0138.
Charcoal Companion; Barbecue Tools and Kitchen Accessories; No Date; Brook 0139–0141.
The Barbecue Store; No Date Copyright 1996–2000; Brook 0142.
Charcoal Companion; No Date; Brook 0143–0148.
The Barbecue Store; Smoker Grill Topper; No Date; Brook 0149–0151.
U.S. TM Electronic search; Mar. 8, 2000; Brook 0152.
Catalog City; Compact Gourmet Grill Topper Combo; No Date; Brook 0153.
Brinkman Corporation 1994 Product Catalog 0006–0008.*
Charcoal Companion Catalog, 1994, p. 20.*
Chef's Catalog, 1991, p. 55.*
Grill Lover's Catalog, date unknown.*
Chef's Catalog, 1993, p. 19.*
Chef's Catalog, 1994, p. 55.*

* cited by examiner

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–19 and 27 is confirmed.

Claims 20, 22, and 25 are determined to be patentable as amended.

Claims 21, 23, 24 and 26, dependent on an amended claim, are determined to be patentable.

New claims 28, 29, 30, 31 and 32 are added and determined to be patentable.

20. A device for [cooking or] grilling *on the top of a cooking surface of an outdoor grill* small pieces of food comprising a basket of [(i)] mesh made of a suitable material for [cooking or] grilling small pieces of food [or (ii) a perforated metal], said basket having a base and four adjoining side walls, wherein two opposite side walls each have an outwardly facing top edge large enough to permit grasping of the device.

22. The device as claimed in claim 21 wherein the [perforated metal] *mesh* is perforated stainless steel having circular or square openings that measure between about 0.2 and about 0.8 inches across.

25. The device as claimed in claim 21 further comprising a lid that may be placed on top of the device, said lid consisting essentially of a flat rectangular piece of said [perforated metal] *mesh*.

28. *A device as claimed in claim 20, wherein the outwardly facing top edges are mesh.*

29. *A method as claimed in claim 27, wherein two opposite side walls each have an outwardly facing top edge large enough to permit grasping of the device.*

30. *A method as claimed in claim 29, wherein the outwardly facing top edges are mesh.*

31. *A method as claimed in claim 27, wherein the basket is mesh.*

32. *A method as claimed in claim 31, wherein the mesh is coated with a non-stick coating.*

* * * * *